(12) United States Patent
Kitchin

(10) Patent No.: US 7,130,904 B2
(45) Date of Patent: Oct. 31, 2006

(54) MULTIPLE LINK LAYER WIRELESS ACCESS POINT

(75) Inventor: Duncan M. Kitchin, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 689 days.

(21) Appl. No.: 09/931,960

(22) Filed: Aug. 16, 2001

(65) Prior Publication Data

US 2003/0037169 A1 Feb. 20, 2003

(51) Int. Cl.
 *G06F 15/173* (2006.01)
 *H04Q 7/00* (2006.01)
 *H04Q 7/24* (2006.01)
 *H04J 3/16* (2006.01)

(52) U.S. Cl. .................. 709/225; 370/328; 370/338; 370/465; 370/466

(58) Field of Classification Search ................ 370/328, 370/338, 465, 466
See application file for complete search history.

(56) References Cited

U.S. PATENT DOCUMENTS

2004/0214572 A1* 10/2004 Thompson et al. ...... 455/435.2

* cited by examiner

*Primary Examiner*—John Follansbee
*Assistant Examiner*—Ashok B. Patel
(74) *Attorney, Agent, or Firm*—Frankie Ho

(57) ABSTRACT

Disclosed are a system and method for permitting communication between subscribers in a wireless network and devices coupled to one or more wired communication networks. A transceiving circuit transmits data to or receives data from one or more subscribers through a wireless transmission medium. A first data link control (DLC) circuit is adapted to transmit data between the transceiveing circuit and one or more devices coupled to a first wired communication network. A second DLC circuit is adapted to transmit data between the transceiving circuit and one or more devices coupled to a second wired communication network.

26 Claims, 3 Drawing Sheets

MULTIPLE LINK LAYER WIRELESS ACCESS POINT

BACKGROUND

1. Field

The subject matter disclosed herein relates to communication systems. In particular, embodiments disclosed herein relate to communication in a wireless network.

2. Information

The use of local area networks (LANs) in has become commonplace in enterprises. A LAN typically consists of a wired communication network for coupling devices such as, for example, personal computer work stations, printers, data servers, and the like. Devices coupled as part of a LAN are typically assigned a unique address in the LAN to enable the transmission of data frames or packets to destination devices in the LAN.

Devices coupled to a wired communication network as part of a LAN are typically coupled to fixed locations limited by a physical connection to the wired communication network at a network interface circuit (NIC) on the devices. Accordingly, mobility of devices coupled to a wired communication network as part of a LAN is typically limited by a tethering of the devices by the physical connection.

To allow some devices in a LAN to be mobile, wireless access points have enabled mobile devices to communicate with through a wired communication network using protocols such as, for example, wireless LAN standard IEEE 802.11. However, deployment of multiple wireless access points to provide adequate coverage over a given facility may be costly. Accordingly, there is a need to provide low solutions that enable mobile devices to communicate with devices through wired communication networks.

BRIEF DESCRIPTION OF THE FIGURES

Non-limiting and non-exhaustive embodiments of the present invention will be described with reference to the following figures, wherein like reference numerals refer to like parts throughout the various figures unless otherwise specified.

DETAILED DESCRIPTION

Figure 1:
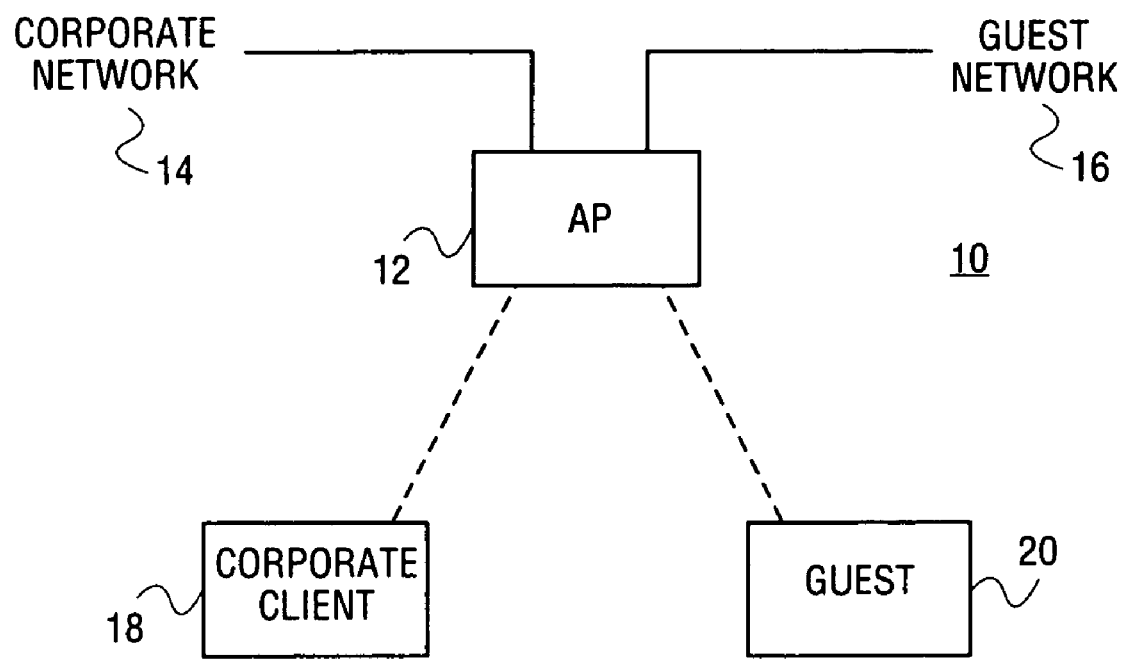
FIG. 1 shows a schematic diagram of a wireless access point coupled to one or more wired communication networks according to an embodiment of the present invention.

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

A "processing system" as discussed herein relates to a combination of hardware and software resources for accomplishing computational tasks. Such a processing system may be included in a communication device and may host application processes for communicating with processes hosted on other communication devices through a communication network. However, this is merely an example of a processing system and embodiments of the present invention are not limited in this respect.

A "transmission medium" as referred to herein relates to any media suitable for transmitting data. A "wireless transmission medium" as referred to herein relates to a transmission medium suitable for transmitting data between or among points without the use of a physical connection of wires or cabling between the points. For example, a wireless transmission medium may be used to transmit data between antennae at radio frequencies. Also, data may be transmitted through a wireless transmission medium in any one of several formats such as that provided in wireless local area network (WLAN) standard IEEE 802.11 and other standard based protocols. However, these are merely examples of how data may be transmitted in a wireless transmission medium and embodiments of the present invention are not limited in these respects.

A "transceiving circuit" as referred to herein relates to circuitry capable of transmitting data to or receiving data from one or more devices through a transmission medium. Such a transceiving circuit may be capable of transmitting and receiving data. Other transceiving circuits may be capable of only transmitting or receiving data. Also, other transceiving circuits may be capable of transmitting and receiving data at non-overlapping intervals. However, these are merely examples of a transceiving circuit and embodiments of the present invention are not limited in these respects.

A "wired communication network" as referred to herein relates to a network of communication devices coupled by a wired transmission medium. Such a wired transmission medium in a wired communication network may include, for example, coaxial, twisted pair copper wire or optical cabling. Also, such a wired communication network may define a protocol for the transmission of data among the devices in the wired communication network such as protocols defined in IEEE 802.3 (Ethernet) or IEEE 1394 (Firewire) standards. Also, multiple wired communication networks may share a common physical transmission medium through which a communication protocol controls access to devices coupled to the common physical transmission medium. However, these are merely examples of a wired communication network and embodiments of the present invention are not limited in these respects.

"Encryption" as referred to herein relates to a translation of data according to a secret code to provide encrypted data. For example, data may be encrypted according to an encryption process such that an encryption key is used to recover the original data prior to the encryption process. However, this is merely an example of encryption and embodiments of the present invention are not limited in this respect.

A "data link control (DLC) circuit" as referred to herein relates to circuitry which provides a communication interface to a transmission medium. For example, a DLC circuit may provide an interface to devices on a network through a wired or wireless transmission medium. Also, a DLC circuit may be associated with a network address of a node in a communication network. However, these are merely examples of a DLC circuit and embodiments of the present invention are not limited in this respect. A DLC circuit may comprise an application specific integrated circuit (ASIC), a dedicated processing system, logic hosted on a shared processing system, or any combination of an ASIC, dedicated processing system or shared processing system. However, these are merely examples of structures which may be used to implement a DLC circuit and embodiments of the present invention are not limited in this respect.

The terms "client" and "subscriber" shall be herein referenced interchangeably throughout. Such a client or subscriber as referred to herein relates to a process executing in association with a device in a communication network to communicate with other processes through the communication network. Such a device in a communication network may comprise a network interface circuit (NIC) which enables data transmission and reception in a wired or wireless transmission medium according to a transmission format or protocol. The client or subscriber process may then be hosted on a processing system coupled to the NIC for transmitting data to and receiving data from other processes through the transmission medium. Such a client or subscriber may communicate with other processes in a network according to a communication protocol to receive one or more services. However, these are merely examples of a client or subscriber, and embodiments of the present invention are not limited in these respects.

A "class" of clients or subscribers as referred to herein relates to an association of clients or subscribers according to one or more common traits. A class of clients or subscribers may be defined based upon a common relationship to one or more communication networks. For example, clients or subscribers to one or more enterprise networks may be associated with a "guest" class or "corporate" class distinctions. Such a class distinction may define access privileges to one more of such enterprise networks according to a network policy. However, these are merely examples of how subscribers or clients may be associated in classes, and embodiments of the present invention are not limited in this respect.

Briefly, an embodiment of the present invention is directed to system and method for enabling communication between subscribers in a wireless network and devices coupled to one or more wired communication networks. The system may comprise a transceiving circuit to communicate with devices through a wireless transmission medium. A first data link control (DLC) circuit may be adapted to transmit data between the transceiveing circuit and one or more devices coupled to a first wired communication network. A second DLC circuit may be adapted to transmit data between the transceiving circuit and one or more devices coupled to a second wired network. However, this is merely an example of an embodiment of the present invention and other embodiments may not be limited in these respects.

FIG. 1 shows a schematic diagram of a wireless access point 12 coupled to one or more wired communication networks according to an embodiment of the present invention. The wireless communication access point 12 is coupled to communicate with devices on a first wired communication network 14 and devices on a second wired communication network 16. Such devices coupled in the first and second wired communication networks 14 and 16 may include, for example, communication devices coupled to the access point 12 through wired transmission media. Such devices coupled in the first and second wired communication networks 14 and 16 may also include facilities such as printers, data servers (including Internet servers coupled to the Internet through a gateway), other wireless access points, media servers, overhead projectors for displaying images from digital images (e.g., InFocus® projectors) or the like. However, these are merely examples of devices which may be coupled to a wired communication network and embodiments of the present invention are not limited in these respects.

In one embodiment, the wired communication networks 14 and 16 may each comprise distinct physical transmission media coupled to the access point 12. For example, the wired communication network 14 may comprise a first physical transmission medium coupling devices to the access point 12 and the wired communication network 16 may comprise a second physical transmission medium coupling devices to the access point 12 such that the first and second physical transmission media are distinct. However, this is merely an example of how multiple wired communication networks may be coupled to a wireless access point and embodiments of the present invention are not limited in this respect.

In another embodiment, the wired communication networks 14 and 16 may share a common physical transmission medium coupled to the access point 12 but define distinct logical networks. For example, the wired communication networks 14 and 16 may each define a virtual local area network (VLAN) in a common physical transmission medium. However, this is merely an example of how multiple wired communication networks may communicate with a wireless access point and embodiments of the present invention are not limited in this respect. In another embodiment, the access point 12 may be coupled to three or more wired communication networks in any combination of common or distinct physical transmission media. Again, this is merely an example of how three or more wired communication networks may communicate with a wireless access point and embodiments of the present invention are not limited in this respect.

According to an embodiment, different classes of subscribers or clients may communicate with devices on either of the wired communication networks 14 or 16. Some classes of subscribers may have access to only one of the wired communication networks 14 or 16 and other classes of subscribers may have access to both of the wired communication networks. In the illustrated embodiment, for example, a client process 18 associated with a class of "corporate" clients may communicate with either wired communication network 14 or 16 through the access point 12 while a client process 20 associated with a class of "guest" clients may only have access to wired communication network 16 through the access point 12. In another embodiment, access to each wired communication network may be restricted to a single class of subscribers. However, these are merely examples of how a wireless communication access point may provide different classes of wireless subscribers or clients with access privileges to multiple wired communication networks, and embodiments of the present invention are not limited in this respect.

According to an embodiment, wireless subscribers or clients may access the wired communication networks 14 or 16 through other access points (i.e., in addition to the access point 12 but not shown in FIG. 1) which are disbursed in a coverage area. In one embodiment, each of a plurality of access points may provide different classes of clients or subscribers with access to either of the wired communication networks 14 or 16. For example, each of the plurality of access points may provide proximate wireless subscribers or clients access to either of the wired communication networks 14 or 16 based upon the membership of the respective subscribers in a class of subscribers. According to an embodiment in which each of a plurality of wireless access points provide access to multiple wired communication networks according to the WLAN standard IEEE 802.11, for example, each wired communication network may be associated with an extended service set (ESS) and each of the plurality of wireless access points may be associated with multiple basic service sets (BSSs), one BSS for each wired communication network accessible through the wireless access point. However, these are merely examples of how multiple wireless communication access points may provide access to multiple wired communication networks, and embodiments of the present invention are not limited in this respect.

Figure 2:
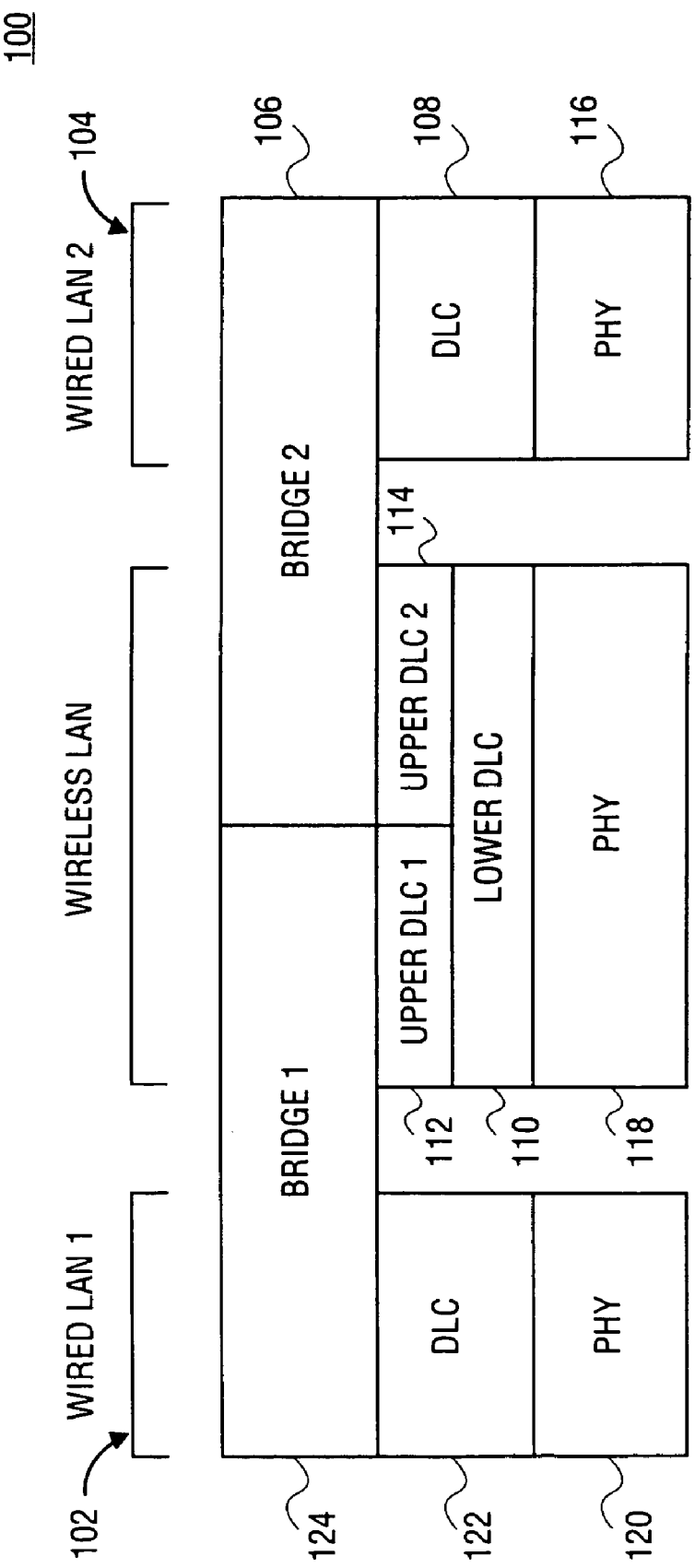
FIG. 2 shows a schematic diagram of a wireless access point according to an embodiment of the wireless access point shown in FIG. 1.

FIG. 2 shows a wireless access point 100 according to an embodiment of the wireless access point 12 shown in FIG. 1. A transceiving circuit and physical transmission medium 118 may be adapted to receive data from or transmit data to client devices via a wireless transmission medium. A lower DLC circuit 110 may process signals transmitted to and from the transceiving circuit and physical transmission medium 118 to provide a common shared channel access to all wired communication networks coupled to the access point 100. However, this is merely an example of how an access point may provide a common transceiving circuit and shared access channel for multiple wired communication networks, and embodiments of the present invention are limited in this respect.

The access point 100 also comprises upper DLC circuits 112 and 114 to process data transmitted between the lower DLC circuit 110 and a wired communication network. Each upper DLC circuit 112 and 114 may be associated with a distinct wired communication network and comprise an associated MAC address on an associated wired communication network. Data processed at the lower DLC circuit 110 and addressed to a first wired communication network 102 may be processed at the upper DLC circuit 112 to be forwarded to the first wired communication network 102 through a communication bridge 124. Similarly, data processed at the lower DLC circuit 110 and addressed to a second wired communication network 104 may be processed at the upper DLC circuit 114 to be forwarded to the second wired communication network 104 through a communication bridge 106. However, this is merely an example of how a wireless access point may forward data addressed to multiple wired communication networks and embodiments of the present invention are not limited in this respect.

Figure 3:
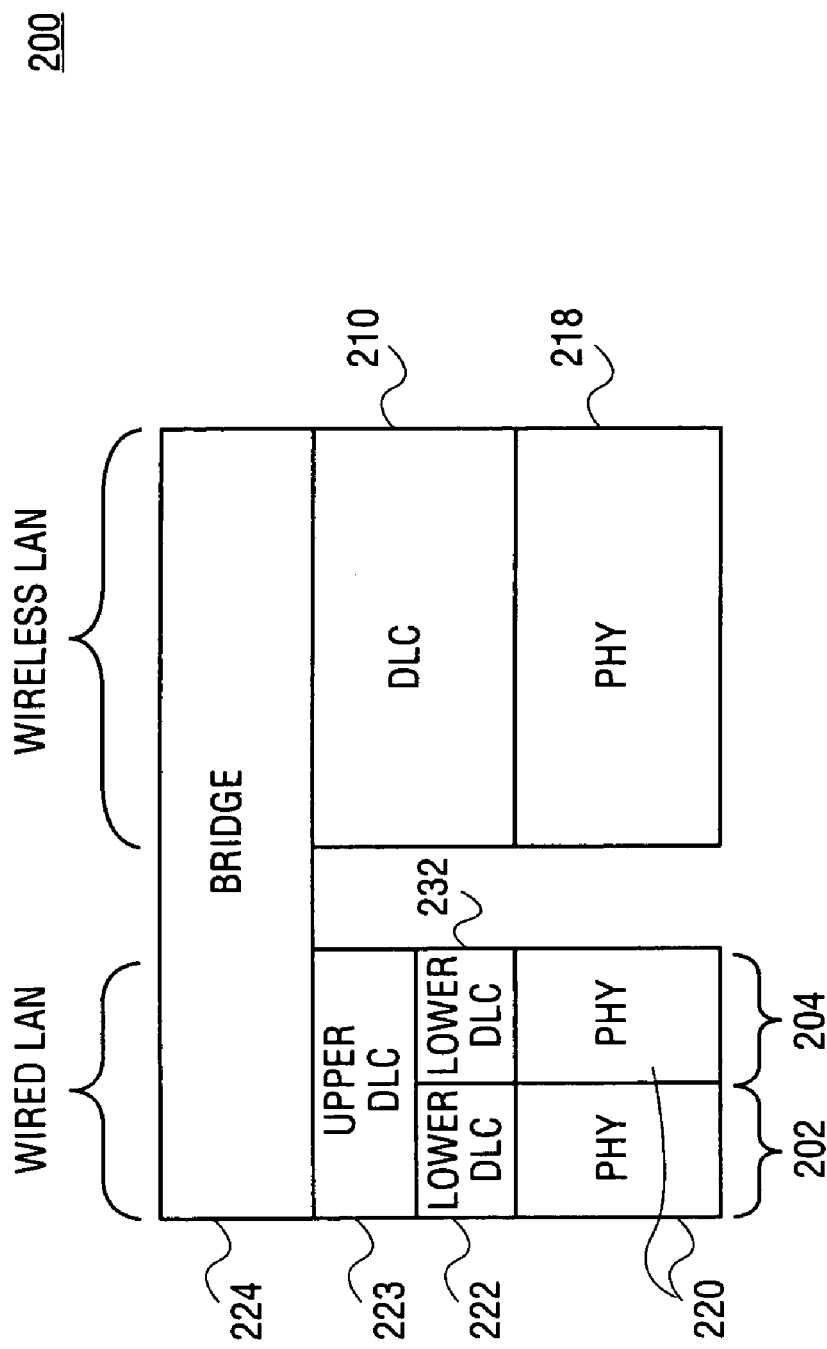
FIG. 3 shows a schematic diagram of a wireless access point according to an alternative embodiment of the wireless access point shown in FIG. 1.

FIG. 3 shows a wireless access point 200 as an alternative embodiment of the wireless access point shown in FIG. 1. Wired communication networks 202 and 204 share a common physical transmission medium 220. A transceiving circuit and physical transmission medium 218 may transmit data between wireless subscribers or clients and devices on either wired communication network 202 or 204. A common upper DLC circuit 223 may provide a common channel access to each of the wired communication networks 202 and 204. A lower DLC circuit 222 may be associated with a first MAC address and lower DLC circuit 232 may be associated with a second MAC address. The lower DLC circuit 222 may transmit data to and from devices associated with the wired communication network 202 through the common physical transmission medium 220. Similarly, the DLC circuit 232 may transmit data addressed to and from devices associated with the wired communication network 204 through the common physical transmission medium 220 (e.g., using different VLAN identifiers for each logical network). However, this is merely an example of how a wireless access point may provide access to multiple wired communication networks through a common physical transmission medium, and embodiments of the present invention are not limited in this respect.

According to an embodiment, the wireless access point 100 shown in FIG. 2 or wireless access point 200 shown in FIG. 3 may be a part of a wireless communication network according to the WLAN standard IEEE 802.11. Here, the access point 100 may be associated with more than one basic service set (BSS), each BSS corresponding with a class of wireless subscribers or clients. Also, in an embodiment in which a wireless access point is part of a larger network with multiple access points, the access point may be associated with multiple extended service sets (ESSs). However, this is merely an example of how a wireless access point may provide access to multiple wired communication networks in accordance with WLAN standard IEEE 802.11 and embodiments of the present invention are not limited in this respect.

An access point in a WLAN according to standard IEEE 802.11 may associate each wired communication network with a media access control (MAC) address such that the access point appears to the wireless subscribers or clients as multiple logical access points. Each BSS may also be associated with a distinct one of the MAC address such that each BSS may define a logical access point for a class of clients or subscribers. Each BSS and corresponding ESS may then define a security policy to ensure that unauthorized clients or subscribers cannot access an associated wired communication network. In the access point 100 shown in FIG. 2, for example, such a security policy may be implemented in encryption performed in either the DLC circuit 112 or 114. In the access point 200 shown in FIG. 3, for example, such a security policy may be implemented in encryption performed in the DLC circuit 222 or 232. However, these are merely examples of how a security policy may be implemented by an access point in a WLAN standard IEEE 802.11, and embodiments of the present invention are not limited in this respect. In either of these embodiments, each subscriber or client process associated with a secure BSS or ESS may have an encryption key which enables access to the associated secure wired communication network. For example, such encryption and decryption logic may be implemented in a processing system hosting the subscriber or client process independent of a NIC in the associated device. Alternatively, such encryption and decryption may be implemented in NIC circuitry. However, these are merely examples of how encryption and decryption may be implemented at a subscriber or client process and embodiments of the present invention are not limited in this respect.

According to an embodiment, a wireless access point providing access to multiple wired communication networks may transmit multiple beacon signals, one beaconing signal for each of the wired communication networks accessible via the access point. In a wireless access point according to the WLAN standard IEEE 802.11, for example, a set of beacons may be transmitted for each BSS and ESS to include an associated BSSID and ESSID. A common Timing Synchronization Function (TSF) may be implemented for the generation of multiple interleaved target beacon transmission times (TBTTs). Here, TBTTs for each BSS of an access point may be interleaved by maintaining constant offsets referenced to the TSF. The access point may transmit a set of beacon signals for each BSS and ESS. The wireless access point may replicate beaconing management processes for each BSS and ESS. However, this is merely an example of how an access point may provide a different beacon signal for each wired communication network accessible by the wireless access point and embodiments of the present invention are not limited in this respect.

While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. An apparatus comprising:
   a transceiving circuit of an access point to transmit data to or receive data from one or more subscribers through a wireless transmission medium;
   a first data link control (DLC) circuit of the access point to transmit data between the transceiving circuit and one or more devices coupled to a first wired communication network;
   a second DLC circuit of the access point to transmit data between the transceiving circuit and one or more devices coupled to a second wired communication network;
   circuitry to control transmission of a first beacon signal and a second beacon signal in a successive manner in the wireless transmission medium from the transceiving circuit; and
   circuitry to generate a plurality of interleaved target beacon transmission times (TBTTs) based on a timing synchronization function (TSF) and to maintain constant offsets between the plurality of interleaved TBTTs based on the TSF,
   wherein the first and second beacon signals are different beacon signals with the first beacon signal comprising information associated with the first wired communication network and the second beacon signal comprising information associated with the second wired communication network.

2. The apparatus of claim 1, wherein the first and second wired communication networks comprise distinct physical transmission media.

3. The apparatus of claim 2, wherein the apparatus further comprises a first bridge coupling the first DLC circuit to the first wired communication network and a second bridge coupling the second DLC circuit coupled to the second wired communication network.

4. The apparatus of claim 1, wherein the first and second wired communication networks comprise a common physical transmission medium.

5. The apparatus of claim 1, wherein the first DLC circuit is associated with a first media access control (MAC) address on the first wired communication network and the second DLC circuit is associated with a second MAC address on the second wired communication network.

6. The apparatus of claim 5, wherein the first DLC circuit is adapted to transmit data between a first class of subscribers and devices coupled to the first wired communication network, and wherein the second DLC circuit is adapted to transmit data between a second class of subscribers and devices coupled to the second wired communication network.

7. The apparatus of claim 5, wherein the first and second DLC circuits are coupled to the transceiving circuit at a common lower DLC circuit, and wherein the first DLC circuit is coupled to the first wired communication network at a first upper DLC circuit and the second DLC circuit is coupled to the second wired communication network at a second upper DLC circuit.

8. The apparatus of claim 1, wherein the first beacon signal is associated with a first basic service set and the second beacon signal is associated with a second basic service set.

9. The apparatus of claim 1, wherein the first beacon signal is associated with a first extended service set and the second beacon signal is associated with a second extended service set.

10. A method comprising:
    transmitting data between a transceiver circuit of an access point and subscribers in a wireless transmission medium;
    transmitting data between the transceving circuit and one or more devices coupled to a first wired communication network through a first data link (DLC) circuit of the access point;
    transmitting data between the transceving circuit and one or more devices coupled to a second wired communication network through a second data link (DLC) circuit of the access point;
    controlling transmission of a first beacon signal and a second beacon signal in a successive manner in the wireless transmission medium from the transceiver circuit, the first and second beacon signals are different beacon signals with the first beacon signal comprising information associated with the first wired communication network and the second beacon signal comprising information associated with the second wired communication network;
    generating a plurality of interleaved target beacon transmission times (TBTTs) based on a timing synchronization function (TSF); and
    maintaining constant offsets between the plurality of interleaved TBTTs based on the TSF.

11. The method of claim 10, wherein the first and second wired communication networks comprises distinct physical transmission media.

12. The method of claim 11, wherein the method further comprises:
    transmitting data between the first wired communication network and the first DLC circuit through a first bridge; and
    transmitting data between the second wired communication network and the second DLC circuit through a second bridge.

13. The method of claim 10, wherein the first and second wired communication networks comprise a common physical transmission medium.

14. The method of claim 1, wherein the first DLC circuit is associated with a first media access control (MAC) address on the first wired communication network and the second DLC circuit is associated with a second MAC address on the second wired communication network.

15. The method of claim 14, wherein the method further comprises:
    transmitting data between a first class of wireless subscribers and devices coupled to the first wired communication network through the wireless transmission medium and the first DLC circuit; and
    transmitting data between a second class of wireless subscribers and devices coupled to the second wired communication network through the wireless transmission medium and the second DLC circuit.

16. The apparatus of claim 5, wherein the first and second DLC circuits are coupled to the transceiving circuit at a common lower DLC circuit, and wherein the first DLC circuit is coupled to the first wired communication network at a first upper DLC circuit and the second DLC circuit is coupled to the second wired communication network at a second upper DLC circuit.

17. The method of claim 10, wherein the first beacon signal is associated with a first basic service set and the second beacon signal is associated with a second basic service set.

18. The apparatus of claim 10, wherein the first beacon signal is associated with a first extended service set and the second beacon signal is associated with a second extended service set.

19. A system comprising:
a transceiving circuit of an access point to transmit data to or receive data from one or more subscribers through a wireless transmission medium;
a processor to transmit data between the transceving circuit and one or more devices coupled to a first wired communication network, to transmit data between the transceiving circuit and one or more devices coupled to a second wired communication network, to control transmission of a first beacon signal and a second beacon signal in a successive manner in the wireless transmission medium from the transceiving circuit, to generate a plurality of interleaved target beacon transmission times (TBTTs) based on a timing synchronization function (TSF), and to maintain constant offsets between the plurality of interleaved TBTTs based on the TSF,
wherein the first and second beacon signals are different beacon signals with the first beacon signal comprising information associated with the first wired communication network and the second beacon signal comprising information associated with the second wired communication network.

20. The system of claim 19, wherein the first and second wired communication networks comprises distinct physical transmission media.

21. The system of claim 20, wherein the system further comprises a first bridge coupling the processor to the first wired communication network and a second bridge coupling the processor coupled to the second wired communication network.

22. The system of claim 19, wherein the first and second wired communication networks comprise a common physical transmission medium.

23. The system of claim 19, wherein the processor is configured to associate the first wired communication network with a first media access control (MAC) address and to associate the second wired communication network with a second MAC address.

24. The system of claim 23, wherein the processor is adapted to transmit data between a first class of subscribers and devices coupled to the first wired communication network and to transmit data between a second class of subscribers and devices coupled to the second wired communication network.

25. The system of claim 19, wherein the first beacon signal is associated with a first basic service set and the second beacon signal is associated with a second basic service set.

26. The system of claim 19, wherein the first beacon signal is associated with a first extended service set and the second beacon signal is associated with a second extended service set.

* * * * *